April 16, 1963　　　M. P. GOSNELL　　　3,085,415
CONTROL SYSTEM FOR AUTOMATIC DRY-CLEANING MACHINES
Filed Dec. 20, 1961　　　　　　　　　　4 Sheets-Sheet 1

INVENTOR.
MICHAEL P. GOSNELL
BY

AGENT

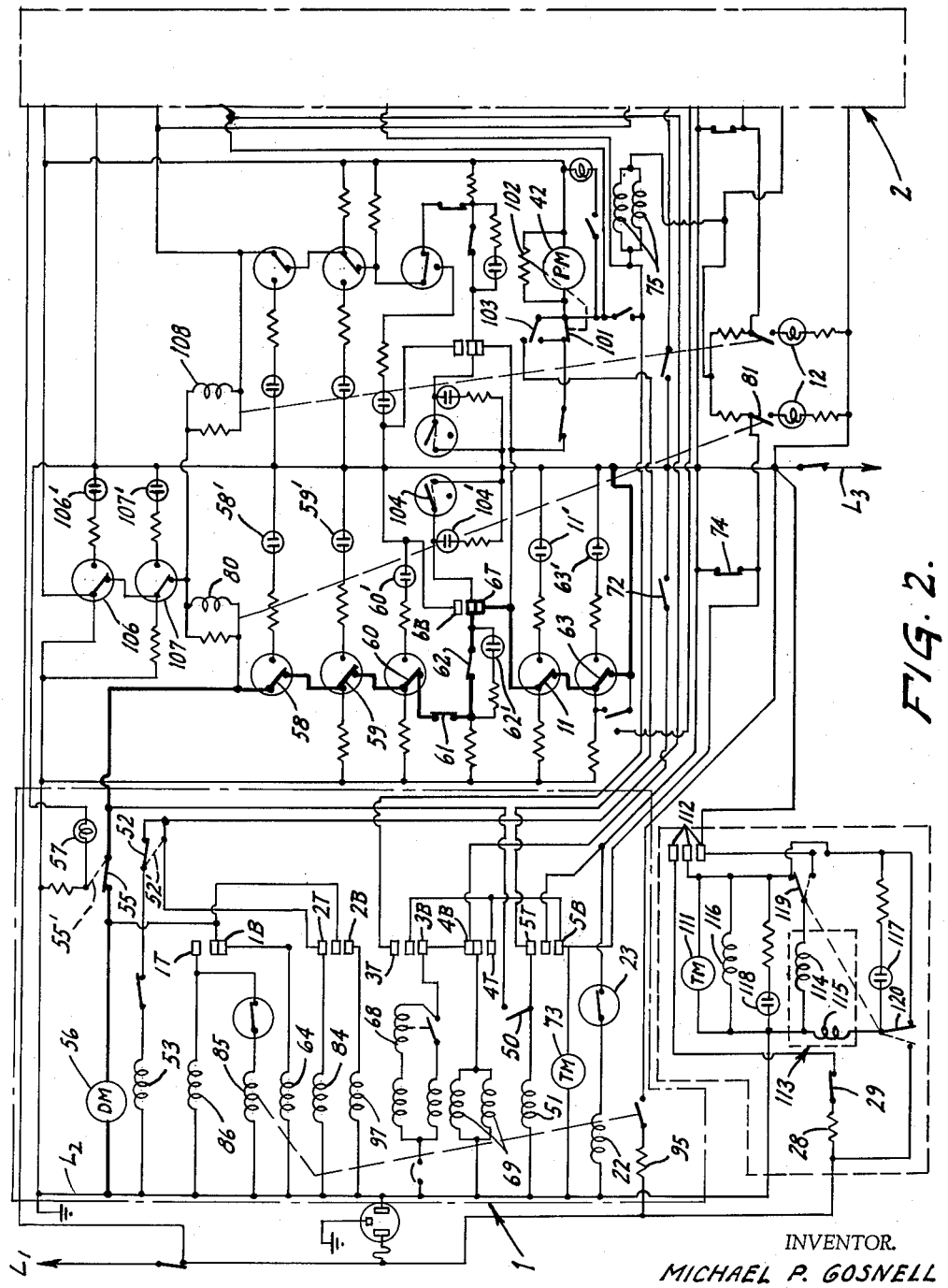

INVENTOR.
MICHAEL P. GOSNELL

April 16, 1963   M. P. GOSNELL   3,085,415
CONTROL SYSTEM FOR AUTOMATIC DRY-CLEANING MACHINES
Filed Dec. 20, 1961   4 Sheets-Sheet 4

INVENTOR.
MICHAEL P. GOSNELL
BY
AGENT

_United States Patent Office_

3,085,415
Patented Apr. 16, 1963

3,085,415
CONTROL SYSTEM FOR AUTOMATIC
DRY-CLEANING MACHINES
Michael P. Gosnell, Philadelphia, Pa., assignor to Philco
Corporation, Philadelphia, Pa., a corporation of Delaware
Filed Dec. 20, 1961, Ser. No. 160,706
10 Claims. (Cl. 68—12)

This invention relates generally to the dry cleaning art and more particularly to an improved control system for use with automatic dry cleaning apparatus.

It is a general object of this invention to provide a control system for use with automatic dry cleaning equipment which achieves maximum utilization of the equipment while insuring optimum protection for the operator.

It is another object of this invention to provide a control system which incorporates as an integral part thereof means for automatically sensing and localizing malfunctioning of the system.

It is a further and more particularized object of this invention to provide a control and failure-indicating system for use with automatic dry cleaning apparatus which permits its optimum utilization by terminating operation of the apparatus only when machine malfunctioning results in a condition which substantially and adversely affects system performance.

The invention has as a still further objective the provision of a control system which automatically prevents access, by other than authorized personnel, to material being cleaned on the the occurrence of a predetermined condition hazardous to the operator.

It is a still further object of this invention to provide a dry cleaning machine which is both compact and easily maintained.

The above mentioned and other objects within contemplation will be more readily understood by reference to the accompanying detailed description and drawings, in which:

FIGURE 2 is a wiring schematic disclosing one form of circuitry for accomplishing automatic control of a plurality of dry cleaning units in accordance with the present invention;

Briefly described the invention from an apparatus aspect comprises the provision of a control system, embodying a complement of failure-sensing devices, encoded to effectuate optimum utilization of the machine consistent with operator safety.

The main features of the control system are sequentially to regulate the washing, extracting and solvent recovery operations of one or more dry cleaning units, to coordinate therewith the necessary solvent pumping and diverting functions, to provide both for failure indication and means for automatically localizing the cause of such failure, and to insure, on the occurrence of such a condition, operation of the apparatus consistent with the stated objectives.

A further and more particularized function of the control system is to sense failures in the dry cleaning operational complex and in response to such failures to react by either discontinuing operation of certain components and permitting the machine to complete its cycle of operation but preventing subsequent operations; by terminating operation and "locking out" the unit to prevent access by unauthorized personnel; or by permitting the malfunctioning unit to complete its cycle of operation without impairment of any of its component parts and then preventing subsequent cycles of operation. In the event of a malfunction the defective condition is visually indicated through operation of an "out of order" light on the front panel of the affected machine and the cause of failure automatically telemetered to a maintenance monitor panel by means of the unique control system, a preferred embodiment of which will hereinafter be described.

The cleaning cycle of a conventional dry cleaning unit is composed of four phases. The first or cleaning phase consists of tumbling the material to be cleaned in a recirculating stream of solvent which is desirably undergoing constant filtering. This is followed by an extraction period during which absorbed solvent is centrifuged from the material. The material is then dried by forced circulation of heated air in a closed system to permit reclamation of vaporized solvent by a condensation process after which the unit is vented to the atmosphere and any residual vapors exhausted from the system.

Figure 1:
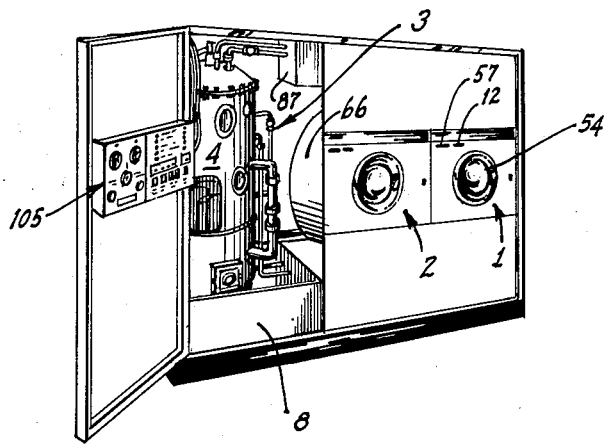
FIGURE 1 is a perspective view of a multiunit, coin-operated dry cleaning assembly embodying the present invention.
Figure 3:
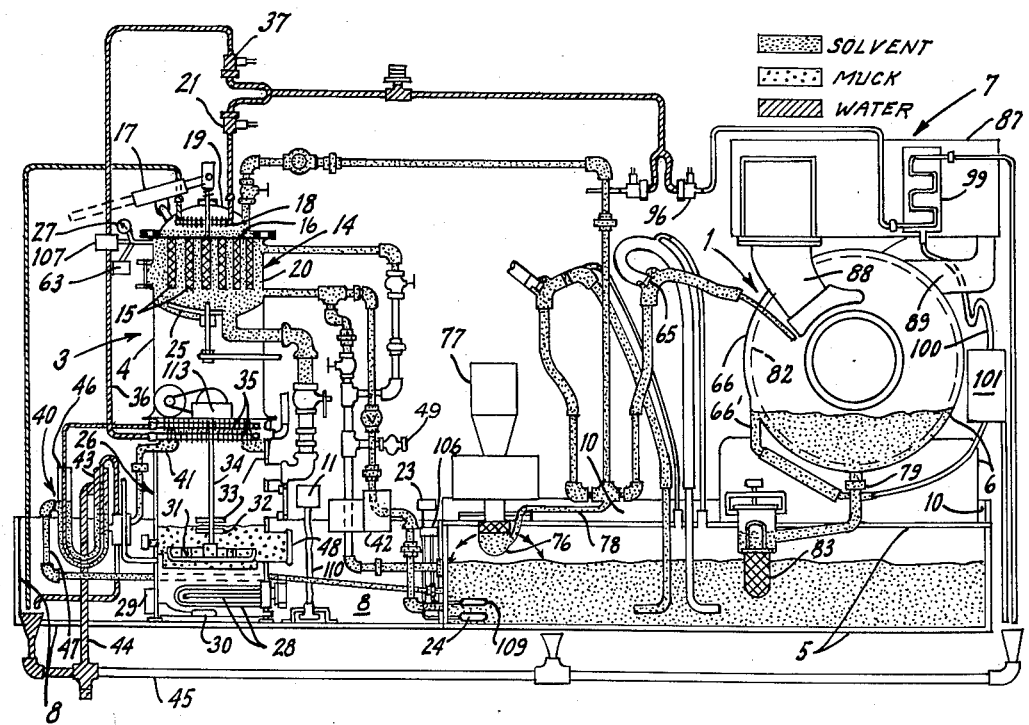
FIGURE 3 is a solvent and water circuit schematic depicting one arrangement of plumbing used in multiunit arrangements of the type illustrated in FIGURE 1.

The dry cleaner assembly shown in FIGURE 1 is comprised of two complete dry cleaning units 1 and 2, along with their common solvent conditioning system 3 housed within the enclosure 4. Referring to FIGURE 3, the basic structural element of this machine is a suitably re-enforced solvent storage tank 5 which supports the entire machine. Each of the dry cleaning units basically consists of a chassis 6, which may for example be of the type used in commercial clothes washing machines, surmounted by a water-cooled condenser drying system 7. Each of the dry cleaning units is mounted to a pivotable base, not shown, and is arranged to be tilted forward 90° so that major servicing may be accomplished from the front of the machine. For economy of operation, and to achieve maximum compactness, both units are serviced by a single solvent storage tank 5 and conditioning system 3. The two dry cleaning units—only one of which is shown for simplicity of illustration—are mounted on top of a fully enclosed portion of the solvent storage tank 5. The filter and "muck" cooker assembly, or solvent conditioning system 3 is shown to the left in FIGURE 3 and is mounted within a well enclosure 8 constructed adjacent the storage tank 5. The top of this enclosure is open and provides a reservoir for the entire solvent volume in the event of a leak in the solvent circuit. The fully enclosed portion of the storage tank has a gutter system 10 around three sides of its perimeter for draining any leakage from either of the dry cleaning units or conditioning system into the reservoir. A solvent leak switch 11 located within the reservoir completely terminates operation of both machines and turns on an "out of order" light 12 located on the front of each machine, if fluid enters the open top portion of the tank during the clean phase of the dry cleaning cycle. A filter 14 is located at the top of the solvent conditioning system 3 and preferably consists of 36 stainless steel braided wire filter tubes 15, each of which is approximately 23" long and 1" in diameter. The total filter area afforded by this arrangement is approximately 18 sq. ft. When pressure is applied to the filter through means of the velocity head developed during solvent flow, these tubes contract around an internal stainless steel support spring, not shown, thus forming a porous surface ideal for the deposit of a diatomaceous earth pre-coat which serves as the filtering material. By the employment of this type of construction when the filter pressure is relieved the filter tubes relax by increasing in diameter and decreasing in length. This relaxation mechanically assists in loosening contaminated filtering material from the tubes. Each of these tubes is closed off at its lower end such that solvent flow is through the filter-coated braid comprising the tube's outer surface. The plate 16 to which the filter tubes are mounted is connected to a crank arm 17 which is vertically reciprocable to facilitate removal of contaminated filtering material. A solvent cooling coil 18 is located in the dome 19 of the filter enclosure 20. The water flow through this cooling coil is, in the illustrated embodiment, approximately one half gallon per minute and is regulated on an on-off basis by a water valve 21. This valve is operated by a solenoid 22 which in turn is controlled by a thermostat 23 whose sensing bulb 24 is located within the solvent storage tank 5 (FIGURE 3). When using a solvent such, for example, as perchlorethylene ($C_2Cl_4$), its temperature is desirably maintained between 70–80° F. The total solvent requirements of the illustrated machine is approximately 90 gallons. By locating the sensing bulb 24 in a position remote from the cooling coil 18 a more accurate indication of operating conditions may be obtained. It is important to maintain the temperature of the solvent within the prescribed temperature range in order to prevent emulsification which occurs at temperatures in excess of 80° F. and to prevent impairment of the solvent's cleaning ability resulting from temperatures below 70° F. A stirring bar 25 is located in the bottom of the filter enclosure 20 to assist in moving the filter muck deposited on the bottom of the enclosure into the muck cooker 26 housed within the lower portion of the enclosure 4. A representative circulation capacity for a filtering system designed to service two dry cleaning units is 750 gallons per hour. A pressure gauge 27 is positioned to monitor the pressure on the high side of the filter tubes 15 to provide an indication of the filter's condition.

The muck cooker, as seen in FIGURE 3, is disposed beneath the filter assembly 14, the cooker receiving its distillation heat energy from a 3150 watt, 230 volt, electric heating unit 28 located adjacent the under surface of the cooker 26. The distillation temperature is controlled by a thermostat 29 whose sensing bulb 30 is located on the outside wall of the cooker at the level of the floor. A muck agitator 31 is located at the bottom of the muck cooker to stir the muck during the distillation cycle. This agitator also helps to dump the muck remaining after distillation by reversal of its rotation (counterclockwise as viewed from the top). Two circular collars 32 and 33 are attached to the muck cooker shaft 34 to provide an indication of the muck level in order to aid in determining the time required to effect complete distillation. The muck cooker condenser 35 is supplied water by means of conduit 36 at the rate of about ½ gallon per minute. The flow of water to the condenser is controlled by valve 37 operated by solenoid 116. A water separator 40 is located in the condensate outlet 41 from the muck cooker to effect removal of any water entrained in the solvent distillate before the solvent is returned to the storage tank 5 for recirculation throughout the system by the continuously operating pump 42. Because of the higher specific gravity of the solvent the water floats to the surface. As the admixture enters the separator the water rises in the right leg 43 of the U tube overflowing into the conduit 44 communicating with the outlet drain 45. As a result of the static head developed in the right leg of the U tube the solvent is forced into the left leg 46 where it overflows into conduit 47 located below the level of the water overflow outlet 44, returning the solvent to the storage tank 5. The baked residue or muck is removed through clean-out door 48. Solvent which has been lost may be replaced at periodic intervals through the solvent fill valve 49.

Referring to FIGURE 2 and assuming that the solvent pump 42 which supplies solvent to both dry cleaning units 1 and 2 is operating, and the required pressures are maintained at the solvent filter 14, either unit is placed in operation by the insertion of a predetermined number of coins in a coin meter located on the unit front panel. While both dry cleaning units may be operated concurrently, for simplicity of explanation the operation of only unit 1 will be described.

To facilitate illustration of the system's control circuitry only that portion of the circuitry which regulates the operation of unit 1 and that which is common to both units inclusive of each unit's complement of failure sensing devices, has been shown. The individual control circuit of unit 2 is identical to that part of unit 1 shown enclosed by dashed lines in FIGURE 2 and accordingly has only been symbolically indicated at the extreme right of FIGURE 2.

As each coin is dropped through the meter a momentary coin switch 50 is closed providing a temporary circuit through the coin relay 51. This relay operates a conventional stepper (not shown) switch through a prescribed angular increment for each impulse of current until a cam, not shown, moves the single pole double throw switch 52 into the full line position shown on the wiring diagram. This action causes the door lock solenoid 53 to be energized locking the clothes door 54 of unit 1. The latch to this door whose operation will be described more fully hereinafter, is of the double acting type and is designed to require the solenoid 53 to be consecutively deenergized and energized to cause the latch to perform its locking or unlocking function. The movement of the latch into the locking position causes a single pole double throw door lock switch 55 associated therewith to be moved into the full line position shown thereby energizing the unit drive motor 56 and removing the bypass from bulb 57, located on the front panel, signalling that the unit is in operation.

The wiring diagram of FIGURE 2 shows the control circuit as it would be at the beginning of timer operation after the previously mentioned starting functions have been performed.

The drive motor 56 of dry cleaning unit 1 is supplied operating voltage from lines $L_2$ and $L_3$. The motor circuit from $L_2$ to line $L_3$ is uniquely arranged to include a cascade of failure-indicating devices and requires for motor operation the closure of the heater high temperature stat 58, the cylinder inlet high temperature stat 59, belt switch 60, exhaust blower centrifugal switch 61, motor overload protector 62, timer contact 6T (closed during the cleaning phase of the cycle), solvent leak switch 11, and the solvent low pressure switch 63. For ease of reference this circuit has been traced in heavy lines in FIGURE 2. Simultaneously with the operation of drive motor 56 solenoid 64 is energized by closure of contact 1B actuating the diverter valve 65 (FIGURE 3) which serves to direct the continuously circulating solvent into tub 66. The solvent, muck, and water flow circuits established during this phase of operation, assuming the solvent cooler and muck cooker to be operating, are graphically illustrated in FIGURE 3. The solvent level within tub 66 is maintained at the level shown by reducing the flow capacity of the outlet 79 and by preventing excessive solvent build-up by provision of a side drain 66'.

Figure 4:
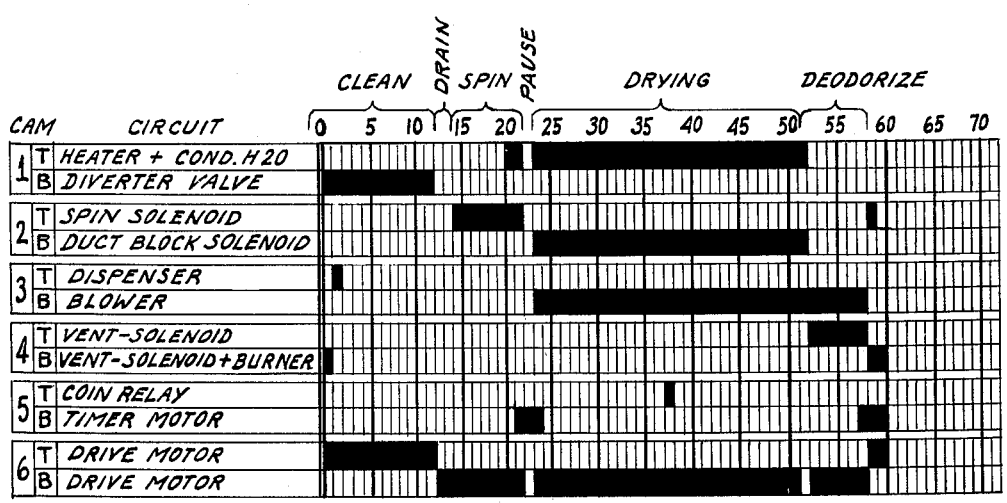
FIGURE 4 is a timer chart depicting, in schematic form, the sequence of operations comprising a fail-safe dry cleaning cycle.

Referring to the timer cam chart shown in FIGURE 4, it will be seen that contact 4B is closed during the first interval of operation and the last two intervals of the prior cycle of operation. The purpose served by energizing this contact is to condition the drying system circuitry so that on opening of the access door 54, the blower 67

Figure 6:
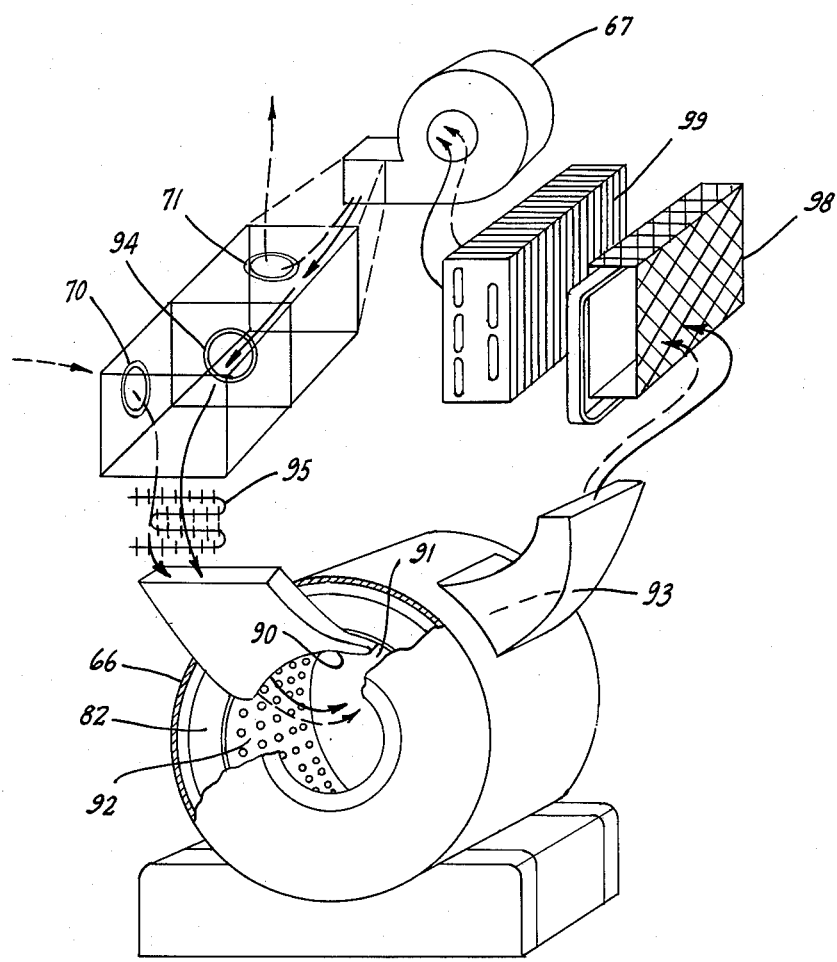
FIGURE 6 is a diagrammatic representation of the drying system used with each of the dry cleaning units.

(FIGURE 6) operated by relay 68 and the vent solenoids 69 which control operation of inlet shutter 70 and exhaust shutter 71 are energized to permit venting of the unit to ambient. (The drying system is schematically illustrated in FIGURE 6.) This operation, however, is averted by a normally closed, single-pole, single-throw door switch 72 connected in series circuit with contact 4B. This switch is opened on closing of the clothes cylinder door 54, causing the "vent" solenoids and blower to remain deenergized. To compensate for wear, and to provide a substantial safety factor, the cam which controls operation of contact 4B is constructed to span three increments of operation.

The timer 73 during this phase of operation, is energized through closure of the drive motor centrifugal switch 74. When the timer has advanced through the first interval of operation contact 3T is energized causing the dispenser solenoids 75 to be energized which action allows a charge of solvent clarifier to be dispensed into the solvent storage tank 5 through mixing bowl 76. One preferred type of clarifier is comprised of ⅓ amorphous diatomaceous earth, ⅓ carbon to effect removal of color bodies; and ⅓ inverted microcrystalline silicas to effect removal of fatty acids. The solvent clarifier dispenser 77 shown in FIGURE 3 is a positive displacement device which injects two ounces of clarifier into the system at the beginning of each dry cleaning cycle. The clarifier is dumped, in dry form, into the mixing chamber 76 located within the solvent storage tank 5. A continuous flow of solvent is fed into this chamber through line 78. The churning action thus produced results in a thorough admixing of the solvent and clarifier producing a slurry which flows out of the mixing chamber directly into the solvent storage tank in the manner indicated by the arrows. Concurrently with the energizing of timer contact 3T, contact 4B is opened. At the end of the second interval of operation contact 3T is opened, deenergizing the dispenser solenoids 75.

The cleaning phase continues for twelve 40 second increments at which point, the diverter valve 65 is deenergized by opening of contact 1B returning the valve, through the intermediation of solenoid 64, to its by-pass position. This latter position of the valve is maintained during the remainder of the dry cleaning cycle. At this same instant of time contact 6T is opened immediately followed by a closing of contact 6B. This switching action removes the solvent leak switch 11 and low pressure switch 63 from the drive motor circuit.

The philosophy underlying this switching arrangement is to obtain optimum utilization of the machine while at the same time insuring maximum protection for the operator. Accordingly the dry cleaning operation is discontinued only if a defect occurs which materially affects the machine's operation and/or results in a condition perilous to the operator. In implementing this philosophy if a defect occurs in that portion of the machine monitored by switches 11 and 63 during the cleaning phase of the cycle the machine is stopped, otherwise the unit is permitted to complete its cycle of operation. The reasons for this are that any malfunctioning resulting in actuation of the leak switch 11 during the wash phase is indicative of a condition which will prevent proper dry cleaning of the clothes, i.e. insufficient solvent or inadequate flow. As an additional precaution, actuation of these switches causes the machine to be "locked-out," i.e. access by the operator to the clothes load is prevented, since the clothes at this time would be theoretically saturated with solvent. Similarly, if the solvent low pressure switch 63 is actuated it indicates pump failure or filter blowthrough, either of which conditions prevents proper dry cleaning action. Hence, if these conditions exist during the wash phase the unit is automatically shut down and the clothes load made inaccessible. Should any of these malfunctions occur, however, after the wash phase has been completed they would not prevent proper operation of the unit for the balance of the cycle and hence these switches are removed from the circuit by the opening of contact 6T after completion of the wash phase. Operation of either of these switches will, however, prevent subsequent dry cleaning cycles from being initiated once the dry cleaning cycle during which the malfunctioning occurred has been completed. This is achieved by designing the circuit so that just prior to the end of the cycle, contact 6T is closed again connecting switches 11 and 63 in the motor circuit. This would result, in the event of a failure of the kind, in deactivation of reject relay 80 which depends on the closure of switches 11 and 63 to maintain its energizing circuit. Deactivation of relay 80 operates the out-of-order light 12 located on the front of the defective unit by permitting the switch 81 to close, and prevents further operation of the coin switch 50 until the defect has been corrected. If the cycle has been allowed to go to completion it is desirable to permit the customer access to the unit at the completion of the cycle. This is provided for, in the particular cam sequence shown in FIGURE 4, by allowing, on the 59th interval of operation, contact 2T to be closed before breaking contact 6B. Notwithstanding the fact that these actions are shown as occurring simultaneously it is conventional practice in writing cam specifications to provide for a sequence of actions such as stipulated above. This action could of course also be achieved by providing for opening of contact 6B one increment later.

The clothes cylinder 82 after completion of the cleaning phase continues to turn at low speed for two timer increments before going into high speed extraction in order to provide time for the solvent to drain from the cylinder. The circuit from the clothes cylinder 82 to the storage tank 5 includes a trap 83 for removing buttons and other solid matter from the solvent.

The extraction or spin phase of the cycle is initiated by closure of contact 2T which serves to energize the spin solenoid 84. This action, through suitable linkage, not shown, produces high speed rotation of the clothes cylinder 82. The extraction phase is maintained for a period of about five minutes to insure removal of substantially all solvent. At the beginning of the 20th interval, in the present machine, with the clothes cylinder still spinning, contacts 1T are closed energizing the heater relay 85 and condenser water solenoid 86 which elements control operation of the water-cooled condenser drying system 7. This sequence of events occurs several increments of time prior to the actual "dry" or reclaiming period in order to preheat the duct work and improve operating efficiency.

Each of the water-cooled condenser drying systems 7 comprises a box-like structure 87 surmounting the tub 66 as shown schematically in FIGURE 3. Ducts 88 and 89 provide communicating passageways between the drying system and tub. An air inlet 90 to the drain tub is provided in the front just outside the clothes door opening to permit heated air to be pumped into the open front end 91 of the clothes cylinder 82. Air passes through the cylinder and its perforate sides 92, and exits from an opening 93 located towards the rear of the tub at an approximate two o'clock position as seen in FIGURE 3. A schematic representation of the drying system is shown in FIGURE 6. During the cleaning and extraction phases of the dry cleaning cycle the inlet shutter 70, exhaust shutter 71 (FIGURE 6) and duct-blocking shutter 94 are closed to completely seal off the drying system 7 from the clothes tub and cylinder. The heater 95, blower motor 67 and condenser water valve 96 (FIGURE 3) are left unenergized during the cleaning and extraction phases of the cycle. At the beginning of the 21st interval of operation contacts 5B are closed causing the timer circuit to bypass the motor centrifugal switch 74 in order to prevent interruption of timer operation when the motor comes to rest after completion of the extraction or spin phase. At the end of the 22nd interval of operation contacts 1T, 2T and 6B are opened respectively deenergizing heater relay 85, condenser water solenoid 86, spin solenoid 84, and the drive motor 56 causing the unit to go into a pause period. Since the timer has a circuit through contact 5B at this time, it continues to advance. At the beginning of the 23rd interval contact 6B is closed energizing the motor 56, contact 1T is closed energizing both the heater relay 85 and condenser water solenoid 86, contact 2B is closed activating the duct block solenoid 97, which opens shutter 94 producing the proper air circuit for the drying period, and contact 3B is closed energizing the unit blower 67 causing circulation of air through the solvent reclaiming system 7. At the end of the 24th interval of operation contact 5B is again opened and the timer continues to have a circuit solely through the motor centrifugal switch 74. The unit is now operating in the "dry" period. During this phase of the cycle the inlet shutter 70 and exhaust shutter 71 remain closed. The air circuit which is established during the drying phase is schematically shown by full line arrows in FIGURE 6. The air which is drawn from the clothes cylinder 82 by blower 67 is first passed through the removable lint trap 98 to filter out air borne lint. The air is next impinged on condenser 99 where the solvent vapor carried by the heated air is condensed and the air cooled. The solvent which is reclaimed by this process is directed into the storage tank by conduit means 100 (FIGURE 3) after first being passed through a water separator 101 whose operation and construction is similar to that previously described. After removal of the solvent vapors the air is recirculated over heater 95 to condition the air for further vapor absorption.

At the end of the 37th interval of operation, contact 5T is closed energizing the coin relay 51 which in turn moves the cam driven switch 52 into the dashed line position 52'. This deenergizes the door lock solenoid 53 by connecting it to contact 2T which at the instant of time is open, priming the door latch so that on re-energization of solenoid 53 at the end of the cycle the door will be unlocked. Prior to this action solenoid 53 was energized by a circuit through the pump motor holding relay switch 101 which circuit included both the solvent leak switch 11 and solvent low pressure switch 63. The door lock solenoid is effectively removed from the circuit after the 37th interval of operation and is not again energized until closure of switch 2T at the end of the cycle. Prior to the 37th interval any defect in the door lock solenoid circuit deenergizes the pump motor holding relay 102, opening switch 101. This circuit can only be re-established by manual closure of the momentary switch 103. Accordingly the door latch, which is constructed to require the actuating solenoid 53 to be energized and deenergized before the latch can perfrom its unlocking functions, remains locked until reactivation of solenoid 53 on closure of contact 2T on the next to last interval of cycle operation. At the end of the 38th interval contact 5T is opened deenergizing the coin relay 51.

The drying period continues until the end of the 51st interval at which time contacts 6B are opened. If the heater 95 has been functioning properly the normally open heat sensor stat 104 will be in the closed position shown in dashed lines in FIGURE 2, providing the motor with a bypass circuit to line L₃. In this event the motor 56 will not see a circuit break and will therefore continue to drive through the 51st interval. This action is provided in order automatically to determine whether the heaters 95 have been performing satisfactorily and, if not, to effect "lock out" of the unit and discontinuance of operation by opening of the motor-failure circuit. If a failure condition does exist the heater failure light 104' is illuminated on the maintenance monitor panel 105, and the unit "out of order" light 12 is lit. If the heater is operating satisfactorily the timer continues to advance; contact 6B is closed and contact 1T opened deenergizing the heater relay 85 and water solenoid 86 the latter action closing valve 96. Contact 2B is also opened at this time deenergizing the duct-blocking solenoid 97 closing shutter 94. Contact 4T is simultaneously closed energizing the vent solenoids 69 opening the inlet shutter 70 and exhaust shutter 71. This is the start of the deodorizing phase which concludes the dry cleaning cycle. The air flow pattern established at this time is shown by dashed line arrows in FIGURE 6.

To terminate operation of the unit contact 2T is closed energizing the door lock solenoid 53. As a result of the door latch having been previously primed at the end of 37th interval by closure of contact 5T, as previously discussed, the operation of solenoid 53 unlocks the door. This causes movement of door lock switch 55 to position 55' breaking the circuit to motor 56, door lock solenoid 53, spin solenoid 84 and shorting the unit "on" light 57. The timer motor 73 whose circuit was bypassed around the motor centrifugal switch 74 at the end of the 57th interval of operation by closure of contact 5B continues to run. On the 59th interval of operation contact 4b is closed placing the "vent" solenoids 69 and blower relay 68 in stand-by condition. On opening of door 54 switch 72 is closed opening both the inlet shutter 70 and exhaust shutter 71 and energizing blower 67. This produces positive venting of the clother drum by creating a slightly lower than atmospheric pressure in the drum area. At the end of the run the original motor circuit is again re-established by closure of contact 6T to include the solvent low pressure switch 63 and solvent leak switch 11 in order to prepare the next cycle of operation. The timer eventually deenergizes itself by opening of contact 5B at the end of the 60th interval turning the unit off.

As shown in heavy lines in FIGURE 2, the motor circuit established during the cleaning phase of the cycle includes failure sensing means 58, 59, 60, 61, 62, 11 and 63. Depending on the particular phase of the cycle involved, this circuit contains either the entire complement of enumerated failure-sensing means or only the first five. As has been shown, the only period during which all of these failure-sensing devices are required to be functioning in order to maintain unit operation is during the cleaning phase of the cycle. Each of these devices is so connected that the occurrence of a failure in that portion of the unit monitored by that device causes an indication of that particular failure condition to be telemetered to the maintenance monitor panel 105 where one or more of an array of lights is lit identifying the general area or specific location of the trouble. In addition to providing automatic indication of a failure condition and localization of its cause, the circuit is arranged to either discontinue operation, in the event of a failure adversely affecting the machine's performance, or by allowing completion of the cycle should the failure be of such nature as not substantially to affect the dry cleaning operation. As previously indicated, in the event the failure is one resulting in actuation of switches 11 or 63 and occurs after the cleaning phase of the cycle the unit is not "locked-out" and the cycle is allowed to go to completion.

Complementary to the failure circuit already discussed there is further provided auxiliary failure circuit comprised of a solvent high temperature stat 106 and a solvent high pressure stat 107. As will be seen in FIGURE 2, these two failure-sensing devices are wired in series with a pair of reject relays 80 and 108. These relays are in turn wired in parallel with each other and each individually in series with the motor circuit corresponding to the unit with which they are associated. To simplify explanation of the failure circuit only that portion associated with unit 1 will be described. By employing the described circuit arrangement, an opening of either of switches 106 or 107 will result in deenergization of both relays. If these switches remain closed a failure in an individual motor circuit will deenergize only the reject relay associated with that particular unit. When either of the relays is deenergized the coin meter associated with that relay will not accept coins until the defect has been corrected.

Figure 5:
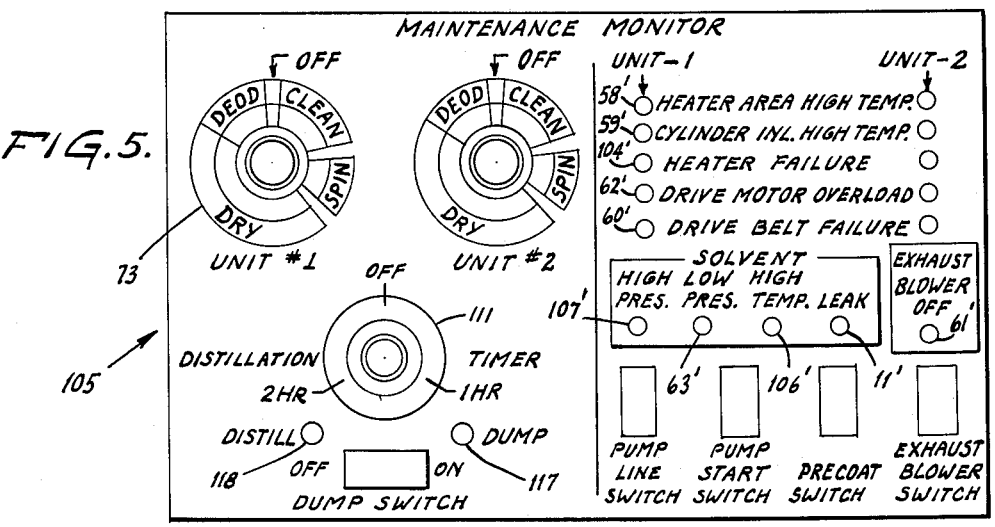
FIGURE 5 is a view of one control panel arrangement designed for use with circuitry disclosed in FIGURE 2.

For example, should the reject relay 80 be deenergized it permits closure of the normally closed switch 81 mechanically coupled thereto. This switch is in series with the "out of order" light 12 and on its closure completes the light circuit from line $L_3$ to $L_2$. However, if the motor centrifugal switch 74 or contact 5B is closed, the light is shorted. Therefore a failure which causes deactivation of the reject relay during a cycle of operation which did not result from a motor circuit failure, i.e. a failure in the circuit traced in heavy lines in FIGURE 2, would not cause the "out of order" light to be illuminated because of the shorting effect just described. It will accordingly be seen that if a solvent high temperature or high pressure failure occurs after the dry cleaning cycle has been initiated, the unit will not be stopped, or the "out of order" light 12 on the front of the unit illuminated, until the cycle has been completed, assuming of course, that no other failures occur during the remainder of the dry cleaning cycle. Moreover actuation of either switches 106 or 107 after initiation of the cycle does not result in the user being "locked out" after completion of the cycle. All future cycles, however, will be prevented until the condition has been corrected since actuation of the reject relay prevents operation of the coin relay necessary to initiate the dry cleaning cycle. Since both dry cleaning units are serviced by a common solvent conditioning system 3 a failure of the type indicated by operation of either of switches 106 or 107, results in both units being made inoperative. The conditions which cause actuation of these switches, however, are not considered to be of such immediate concern as to require shut down of the unit before completion of the cycle during which the defect occurs. Actuation of these switches generally indicates either too high an ambient condition to achieve effective cooling of the solvent or filter blockage producing excessive solvent pressures. The existence of either of these conditions results in energization of the neon bulb associated with the particular switch involved, in the illustrated case either bulb 106' or 107' located on the maintenance monitor panel 105 as shown in FIGURE 5. The actual location of these switches is shown in FIGURE 3, switch 106 being designed to monitor the temperature of the solvent by means of a feeler bulb 109, located near the bottom of the solvent storage tank 5, and switch 107 being constructed and arranged to measure the solvent pressure existing within filter 17.

As previously stated the overriding consideration of the control system is to achieve optimum utilization of the circuit consistent with operator safety. Under some failure conditions this is accomplished by stopping the unit and keeping the door locked. In other cases, it is achieved by allowing the cycle to go to completion, preventing future cycles from being initiated and allowing the user to retrieve the material being dry cleaned at the end of the cycle. For example, actuation of switches 11 or 63 during the cleaning phase of the cycle would open the circuit to both the motor 56 and solvent pump 42 and keep the door 54 locked in order to prevent operator access to the solvent-laden clothes load. The location of these switches is shown in FIGURE 3. Switch 11 communicates with the floor areas of reservoir 8 by means of a flexible tubular extension 110. Any spillage which is drained off into this area acts on the air column within the tubing causing deflection of the switch diaphragm. This assembly, in the illustrated example, is arranged to induce switch action if the solvent level within the well exceeds 1 inch. The other one of these pair of switches, switch 63, is located so as to monitor the pressure within the filter 14, the switch being physically located near the high pressure switch 107 previously discussed. Since the conditions causing operation of these switches have a direct and adverse effect on the cleaning phase of the cycle, actuation of either of these switches during that phase of the dry cleaning cycle terminates operation. The neon lights 11' and 63' associated with these switches are physically located on the maintenance monitor panel in the position shown in FIGURE 5.

As has already been indicated, a failure which would actuate either of these switches during any part of the cycle other than the cleaning phase would stop only the solvent pump 42 whose circuit to line $L_3$ is through these switches. The unit would be permitted to complete the cycle but the circuit would prevent the initiation of future cycles until the defect is corrected. Similarly, a failure condition actuating either switch 106 or 107 which occurs after the cycle has been initiated does not interfere with the completion of that cycle but does prevent the initiation of subsequent cycles. Actuation of any one of the four switches 11, 63, 106 or 107 under the conditions mentioned above, does not prevent operator access to the unit after completion of the dry cleaning cycle.

In contrast to the above if a failure is sensed in the drying system 7, the circuit to motor 56 is opened and the access door locked under all conditions of operation. The solvent pump 42, however, continues to operate. A failure in this portion of the system results in shut down of the unit since it indicates a condition which is damaging to the clothes being cleaned. Switches 58 and 59, respectively located above the lint filter 98 and at the entrance to the clothes cylinder 82, detect excessive heat. Their operation normally indicates failure of the blower 67 or cloggage of filter 98 either of which conditions can result in scorching of the material being cleaned. The function of the drive motor overload switch 62 and the belt switch 60 are self-explanatory and are used to indicate mechanical failure of the belt or a condition resulting in excessive motor current such as would be brought about by overloading of the clothes cylinder. In addition to providing a unit blower, such as blower 67, most underwriter codes require the additional use of an external blower. Where such a provision is required or believed desirable the centrifugal switch 61 of the external blower is electrically interconnected to the failure circuit as shown in FIGURE 2.

It will accordingly be seen that system operation is only interrupted when a condition exists which impairs proper functioning of the machine and that the unit is "locked out" only under circumstances which give rise to a condition which is hazardous to the operator.

Referring to the lower left hand corner of FIGURE 2, a circuit arrangement is shown providing for optimum safety in the operation of the muck cooker 26. The circuit comprises a three hour distillation timer 111 with its associated cam operated switches 112, a heating coil 28, a motor 113, having a main motor winding 114 and start winding 115, water solenoid 116, and a thermostat 29. The solenoid operated valve 37 is operable by solenoid 116 to supply water to the muck distilling condenser 35 at a rate sufficient to maintain proper distillation. A pair of indicator lights 117 and 118 located on panel 105 indicate, respectively, the dump and distill positions. For reasons hereinafter described the motor reversing switch 119 and dump switch 120 are mechanically coupled. To initiate the distillation cycle the dump switch 119 is moved to the off position shown in full lines in FIGURE 2. This insures proper rotation of motor 113, turns on the "distill" light 118 and shorts out the "dump" light 117. To commence operation timer 111 is manually advanced into its start position to close the entire array of contacts 112, placing itself, water solenoid 116, and motor 113 across the 115 v. lines $L_2$—$L_3$, and heater 28 across the 230 v. lines $L_1$—$L_3$. Energization of solenoid 116 opens valve 37 initiating flow of water to condenser 35. Toward the end of the distillation cycle the upper two contacts are first opened to deenergize the muck heater 28 to provide a cool down period during which time the muck agitator 31 continues to be driven by motor 113. On completion of the distillation run, contacts 112 are returned to the open position shown in FIGURE 2. To dump the remaining residue the ganged switches 119—120 are moved into the position shown in dashed lines. This causes the stirring motor start winding 113 to be placed in a circuit which is 180° out of phase with that which was impressed on the winding during the distillation run, causing the motor to rotate in the opposite direction. This reversal in rotation results in movement of the muck agitator 31 in a direction which acts to push the residue toward the outer edge of the cooker aiding in its manual removal. This switching action also energizes the dump light 117 and turns off the distillation light 118. The distillation light and dump light are provided as function indicators and as a warning for insuring that the timer will not be operated during the dumping operations.

In summary the invention in its preferred aspect resides in a novel control system embodying a unique arrangement of failure sensing and indicating devices which cooperatively act to translate into physical form a philosophy which has as its overriding consideration optimum utilization of automatic dry-cleaning apparatus, while insuring maximum operator safety.

Although the invention has been described with particular reference to specific practice and embodiments, it will be understood by those skilled in the art that the apparatus of the invention may be changed and modified without departing from the essential scope of the invention, as defined in the appended claims.

I claim:

1. In dry cleaning apparatus adapted to perform a multiphase dry cleaning cycle of operation of the type described, the combination comprising:
   (a) a movable perforate basket having a wall portion provided with an opening for the passage therethrough of material to be cleaned,
   (b) motor means for moving said basket;
   (c) an enclosure for said basket provided with a door affording access to said opening,
   (d) a solvent-conditioning system,
   (e) means for maintaining circulation of cleaning solvent through said basket during the cleaning phase of the dry cleaning cycle,
   (f) an electrical circuit including timer-actuated control means adapted to provide automatic operation of said apparatus through a sequence of dry cleaning phases,
   (g) failure-sensing means interposed in said electrical circuit and so constructed and arranged to be capable of affecting the operation of said apparatus in a plurality of ways upon the occurrence of predetermined failure conditions, and
   (h) means operable by said control means for automatically modifying the effect which said failure-sensing means has on the operation of said apparatus in accordance with the phase of operation during which said failure condition occurs.

2. In dry cleaning apparatus adapted to perform a multiphase dry cleaning cycle of operation of the type described, the combination comprising:
   (a) a movable perforate basket having a wall portion provided with an opening for the passage therethrough of material to be cleaned,
   (b) motor means for moving said basket,
   (c) an enclosure for said basket provided with a door affording access to said opening,
   (d) a solvent-conditioning system,
   (e) means for maintaining circulation of cleaning solvent through said basket during the cleaning phase of the dry cleaning cycle,
   (f) an electrical circuit including timer-actuated control means adapted to provide automatic operation of said apparatus through a sequence of dry cleaning phases,
   (g) a plurality of failure-sensing devices interposed in said electrical circuit, and
   (h) switch means operable by said control means for automatically modifying the connection of one or more of said devices in said electrical circuit, in accordance with the phase of operation being monitored, that actuation of said devices on the occurrence of a predetermined failure condition effects discontinuance of operation of said apparatus and locking of said door preventing operator access or permits completion of the operational cycle and prevents the initiation of subsequent dry cleaning cycles.

3. In dry cleaning apparatus adapted to perform a multiphase dry cleaning cycle of operation of the type described, the combination comprising:
   (a) a movable perforate basket having a wall portion provided with an opening for the passage therethrough of material to be cleaned,
   (b) motor means for moving said basket,
   (c) an enclosure for said basket provided with a door affording access to said opening,
   (d) a solvent-conditioning system including solvent-filtering means,
   (e) means for maintaining circulation of cleaning solvent through said solvent filtering means,
   (f) an electrical circuit including timer-actuated control means adapted to provide automatic operation of said apparatus through a sequence of dry cleaning phases,
   (g) failure-sensing means connected in said electrical circuit to monitor the pressure and temperature conditions of said solvent-conditioning system, and
   (h) switch means operable by said control means for automatically modifying the connection of one or more of said devices in said electrical circuit, in accordance with the phase of operation being monitored, that actuation of said devices on the occurrence of a predetermined failure condition effects discontinuance of operation of said apparatus and locking of said door preventing operator access or permits completion of the operational cycle and prevention of subsequent dry cleaning cycles.

4. In dry cleaning apparatus adapted to perform a multiphase dry cleaning cycle of operation of the type described, the combination comprising:
   (a) a movable perforate basket having a wall portion provided with an opening for the passage therethrough of material to be cleaned,
   (b) motor means for moving said basket,
   (c) an enclosure for said basket provided with a door affording access to said opening,
   (d) a solvent-conditioning system, including solvent filtering and storage means,
   (e) an air-drying system comprising means for circulating air through said basket and including air-heating means and air-filtering means,
   (f) an electrical circuit including timer-actuated control means constructed and arranged to provide automatic operation of said apparatus through a sequence of dry cleaning phases,
   (g) failure-sensing means connected in said electrical circuit and disposed to monitor the condition of said solvent-conditioning and air-drying systems, and
   (h) switch means operable by said control means for automatically modifying the connection of one or more of said failure-sensing means in said electrical circuit in accordance with the phase of operation being monitored, in order to control the effect of an actuated failure-sensing means on the dry cleaning operation.

5. In dry cleaning apparatus adapted to perform a multiphase dry cleaning cycle of operation of the type described, the combination comprising:

(a) a movable perforate basket having a wall portion provided with an opening for the passage therethrough of material to be cleaned,
(b) motor means for moving said basket;
(c) an enclosure for said basket provided with a door affording access to said opening,
(d) a solvent-conditioning system,
(e) means for maintaining circulation of cleaning solvent through said basket during the cleaning phase of the dry cleaning cycle,
(f) an electrical circuit including timer-actuated control means adapted to provide automatic operation of said apparatus through a sequence of dry cleaning phases,
(g) a plurality of failure-sensing devices interposed in said electrical circuit and adapted to monitor the operation of said apparatus, and
(h) switch means operable by said timer-actuated control means for automatically modifying the circuit connections of certain ones of said devices in accordance with the phase of operation being monitored to effect, on actuation of predetermined ones of said device, on the occurrence of a predetermined failure condition, discontinuance of operation and locking of said door preventing operator access, or, on actuation of predetermined other ones of said devices, completion of the operational cycle during which the malfunctioning occurs and prevention of subsequent dry cleaning cycles.

6. In dry cleaning apparatus consisting of a plurality of individual dry cleaning units serviced by common solvent storage, circulating and filtering systems, the combination comprising:

(a) a movable perforate basket associated with each of said units for the receipt of material to be cleaned,
(b) motor means for rotating said baskets,
(c) an enclosure for each of said baskets provided with a door affording access to said basket,
(d) an air-drying system operably associated with each of said dry cleaning units and comprising air circulating, heating and filtering means,
(e) means for maintaining circulation of cleaning solvent through said filtering system and through one or more of said baskets during the cleaning phase of the dry cleaning cycle,
(f) an electrical circuit including timer-actuated control means adapted to provide automatic operation of individual ones of said units through a sequence of dry cleaning phases,
(g) a plurality of failure-sensing devices interposed in said electrical circuit certain ones of which are adapted to monitor the operation of said solvent system and certain others of which are adapted to monitor the operation of said individual units and their associated systems, and
(h) means operable by said control means for automatically modifying the circuit connections of said solvent monitoring devices in accordance with the phase of operation being monitored so that operation of one or more of said last mentioned devices, on the occurrence of a predetermined failure condition, effects either discontinuance of operation of said solvent circulating means and motor means and locking of said door preventing operator access, or permits completion of the operational cycle while preventing the initiation of subsequent dry cleaning cycles.

7. In dry cleaning apparatus consisting of a plurality of individual dry cleaning units serviced by common solvent storage, circulating and filtering systems, the combination comprising:

(a) a movable perforate basket associated with each of said units for the recipt of material to be cleaned,
(b) motor means for rotating said baskets,
(c) an enclosure for each of said baskets provided with a door affording access to said basket,
(d) an air-drying system operably associated with each of said dry cleaning units and comprising air circulating, heating and filtering means,
(e) means for maintaining circulation of cleaning solvents through said filtering system and through one or more of said baskets during the cleaning phase of the dry cleaning cycle,
(f) an electrical circuit including timer-actuated control means adapted to provide automatic operation of individual ones of said units through a sequence of dry cleaning phases,
(g) a plurality of failure-sensing devices interposed in said electrical circuit certain ones of which are adapted to monitor the operation of said solvent system and certain others of which are adapted to monitor the operation of said individual units and their associated systems, and
(h) means operable by said control means for automatically modifying the circuit connections of various ones of said devices in accordance with the phase of operation being monitored that operation thereof, on the occurrence of a predetermined failure condition, effects either discontinuauce of operation of said solvent circulating means and motor means and locking of said door of the associated unit preventing operator access, or prevents the initiation of subsequent dry cleaning cycles.

8. In dry cleaning apparatus adapted to perform a multiphase dry cleaning cycle of operation of the type described, the combination comprising:

(a) a movable perforate basket having a wall portion provided with an opening for the passage therethrough of material to be cleaned,
(b) motor means for moving said basket,
(c) an enclosure for said basket provided with a door affording access to said opening,
(d) a solvent-conditioning system,
(e) means for maintaining circulation of cleaning solvent through said basket during the cleaning phase of the dry cleaning cycle,
(f) an electrical circuit including timer-actuated control means adapted to provide automatic operation of said apparatus through a sequence of dry cleaning phases,
(g) a plurality of failure-sensing devices interposed in said electrical circuit,
(h) switch means operable by said control means for automatically modifying the connection of one or more of said devices in said electrical circuit, in accordance with the phase of operation being monitored, that actuation of said devices on the occurrence of a predetermined failure condition effects either discontinuance of operation of said apparatus and locking of said door preventing operator access or permits completion of the operational cycle and prevents the initiation of subsequent dry cleaning cycles, and
(i) means so operably associated with each of said failure-sensing devices that actuation of an associated failure-sensing device automatically results in visual indication of the cause of failure.

9. In dry cleaning apparatus consisting of a plurality of individual dry cleaning units serviced by common solvent storage, circulating and filtering systems, the combination comprising:

(a) a movable perforate basket associated with each of said units for the receipt of material to be cleaned,
(b) motor means for rotating said baskets,
(c) an enclosure for each of said baskets provided with a door affording access to said basket,
(d) an air-drying system operably associated with each of said dry cleaning units and comprising air circulating, heating and filtering means,
(e) means for maintaining circulation of cleaning solvent through said filtering system and through one or more of said baskets during the cleaning phase of the dry cleaning cycle,
(f) an electrical circuit including timer-actuated control means adapted to provide automatic operation of individual ones of said units through a sequence of dry cleaning phases,
(g) a plurality of failure-sensing devices interposed in said electrical circuit certain ones of which are adapted to monitor the operation of said solvent system and certain others of which are adapted to monitor the operation of said individual units and their associated systems,
(h) means operable by said control means for automatically modifying the circuit connections of said solvent monitoring devices in accordance with the phase of operation being monitored that operation of one or more of said last mentioned devices, on the occurrence of a predetermined failure condition, effects either discontinuance of operation of said solvent circulating means and motor means and locking of said door of the associated unit preventing operator access, or permits completion of the operational cycle while preventing the initiation of subsequent dry cleaning cycles, and
(i) signal-indicating means so operably associated with each of said failure-sensing devices that actuation of an associated failure-sensing device automatically results in indication of the cause of failure.

10. In dry cleaning apparatus adapted to perform a multiphase dry cleaning cycle of operation of the type described, the combination comprising:
(a) a movable perforate basket having a wall portion provided with an opening for the passage therethrough of material to be cleaned,
(b) motor means for moving said basket,
(c) an enclosure for said basket provided with a door affording access to said opening,
(d) a solvent-conditioning system,
(e) means for maintaining circulation of cleaning solvent through said basket during the cleaning phase of the dry cleaning cycle,
(f) an electrical circuit including timer-actuated control means adapted to provide automatic operation of said apparatus through a sequence of dry cleaning phases,
(g) a plurality of failure-sensing devices interposed in said electrical circuit and adapted to monitor the operation of said apparatus,
(h) switch means operable by said timer-actuated control means for automatically modifying the circuit connections of certain ones of said devices in accordance with the phase of operation being monitored to effect, on actuation of predetermined ones of said device, on the occurrence of a predetermined failure condition, discontinuance of operation and locking of said door preventing operator access, or, on actuation of predetermined other ones of said devices, completion of the operational cycle during which the malfunctioning occurs and prevention of subsequent dry cleaning cycles, and
(i) signal-indicating means connected in circuit with each of said failure-sensing devices so as automatically to localize, on the actuation of an associated failure-sensing device, the failure condition.

References Cited in the file of this patent

FOREIGN PATENTS

| | | |
|---|---|---|
| 344,705 | Switzerland | Apr. 14, 1960 |
| 1,154,581 | France | Nov. 4, 1957 |

OTHER REFERENCES

Cascadex, published October 1957 (page 2).